3,560,258
PATTERN DEPOSIT BY LASER
Alan Douglas Brisbane, Epping, England, assignor to International Standard Electric Corporation, New York, N.Y., a corporation of Delaware
Filed May 31, 1967, Ser. No. 642,403
Claims priority, application Great Britain, July 22, 1966, 33,047/66
Int. Cl. H01s 3/00; C23c 13/04
U.S. Cl. 117—212                 10 Claims

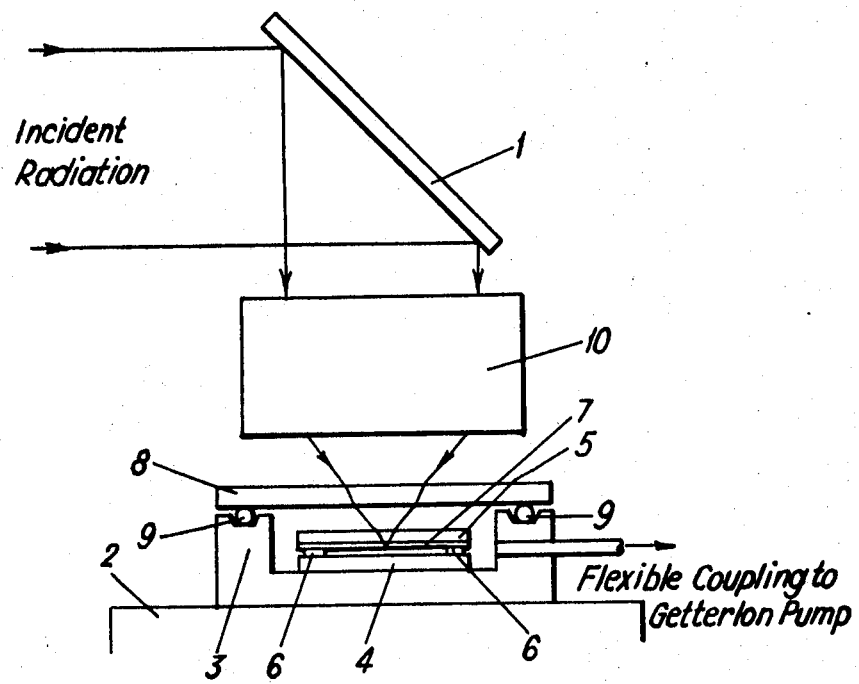

ABSTRACT OF THE DISCLOSURE

A technique for forming an interconnection pattern on a substrate by placing opposite the substrate a film of a vaporizable material disposed on a glass plate. A beam of intense radiant energy scans the metallic film through the glass plate to selectively evaporate portions of the film which deposit on the semiconductor substrate in accordance with the desired pattern.

BACKGROUND OF THE INVENTION

This invention relates to a method for selectively depositing a film on a substrate in accordance with a predetermined pattern.

The invention provides a method whereby a sharply defined pattern of material may be directly "written" on to a substrate without the need for a mask to define the geometry of the pattern. This simplifies the process of deposition by eliminating the necessity for the manufacture of a mask and its subsequent removal if it is of the in-contact kind.

The features of the invention will be described with reference to the method, embodying the invention in its preferred form, of depositing a platinum interconnection pattern on a semiconductor cellular substrate.

SUMMARY

According to the invention there is provided a method for selectively depositing a film of a vaporizable material on a substrate in accordance with a predetermined pattern by the condensation from the vapor state of material evaporated from a layer of said material on a base member situated in juxtaposition to said substrate, wherein the material is evaporated from the base member by the action of local heating in the vicinity of the focus of a converging beam of intense radiant energy, and wherein said pattern is generated by the relative movement of said member and said substrate with respect to the focus of the radiant energy.

In the drawing:

The accompanying drawing shows a vacuum vessel and ancilliary optical components used in practicing the method of the invention.

DETAILED DESCRIPTION

With reference to the accompanying drawing, a beam of infra-red incident radiation of approximately 1.15 microns wavelength emanating from a plane parallel resonator helium-neon laser (not shown) is deflected by a dielectric plane mirror 1 into a direction normal to an "X-Y" co-ordinate table 2 on which is located in a vessel 3 a substrate 4 on which the pattern is to be deposited. Above this substrate is a base member 5 of glass spaced approximately 50 microns from the substrate 4 by a mica separator 6, said base member having a platinum film 7 of approximately 1000 angstroms thickness adhering to its lower surface. The vessel 3 is a vacuum vessel connected by a flexible coupling to a getter-ion vacuum pump (not shown). The radiation from the laser enters the vessel 3 through an optical flat 8 which is sealed to the vessel with an O-ring 9. Before entering the vessel a compound lens 10 of focal length approximately 1.5 cm. converges the radiation and brings it to a focus where it has a diameter of approximately 10 microns in the platinum film 7. The laser is pulsed to give 200 watt pulses with a peak repetition frequency of 2 kHz. This gives sufficient energy density at the focus to cause local evaporation of the film, and the evaporated platinum recondenses on the substrate 4 in the region opposite the area from which it was evaporated. A line of metal is deposited on the first substrate by moving the X-Y co-ordinate table 2 with respect to the focussed radiation and pulsing this radiation at a sufficiently high repetition frequency to result in a line of overlapping dots.

In this embodiment the first substrate is a diffused semiconductor cellular substrate of silicon and the control of the laser pulses and the movement of the X-Y co-ordinate table is programmed to generate lines of appropriate length and direction to establish electrical interconnections on this substrate to make a semiconductor integrated circuit.

While the principles of the invention have been described above in connection with specific embodiments, and particular modifications thereof, it is to be clearly understood that this description is made only by way of example and not as a limitation on the scope of the invention.

I claim:
1. A process for writing a predetermined pattern on a given surface of a substrate, comprising the setps of:
    placing a base member adjacent said substrate, a selected surface of said member having a layer of vaporizable material disposed thereon;
    locally heating a relatively small part of said layer situated in the immediate vicinity of the focus of a converging beam of intense radiant energy, said local heating being sufficient to evaporate said layer part, said evaporated part forming a vapor, said layer being situated in sufficiently close juxtaposed relationship to said given surface so that said vapor condenses on a selected portion of the adjacent part of said given surface to form a portion of said film; and
    successively depositing other layer parts of said film on said substrate in accordance with said predetermined pattern by introducing relative movement between said radiant energy focus and said substrate in accordance with said pattern while maintaining a juxtaposed relationship between said layer and said given surface.
2. A process according to claim 1 wherein said substrate is located on a table capable of movement in an X-Y coordinate manner normal to the direction of said beam of radiant energy.
3. A process according to claim 2 wherein said relative movement step is established by moving said table in a programmed fashion to generate lines of appropriate length and direction on said substrate so as to establish said pattern.
4. A process according to claim 3 wherein said pattern comprises electrical interconnections for a semiconductor integrated circuit.
5. A process according to claim 1, wherein said base member comprises a substance relatively transparent to said radiant energy, a portion of said member being interposed in the path of said beam.
6. A process according to claim 5, wherein said film is electrically conductive.
7. A process according to claim 6, wherein said pattern establishes one or more electrical interconnections between different parts of said substrate.

8. A process according to claim 7, wherein said substrate comprises a semiconductor cellular material.

9. A process according to claim 8 wherein said material is platinum, said base member being spaced approximately 50 microns from said substrate, and said beam of intense radiant energy is supplied from a laser which is pulsed to give 200 watt pulses with a peak repetition frequency of 2 kHz.

10. A process according to claim 8, wherein said semiconductor material comprises silicon.

References Cited

UNITED STATES PATENTS

| | | | |
|---|---|---|---|
| 3,360,367 | 12/1967 | Stricklin | 117— |
| 3,360,398 | 12/1967 | Gariboth | 117—93.3X |
| 3,364,087 | 1/1968 | Solomon et al. | 117—93.3X |
| 3,401,055 | 9/1968 | Langdon et al. | 117—212 |
| 3,046,936 | 7/1962 | Simons, Jr. | 117—93.3X |

FOREIGN PATENTS 720,308  10/1965  Canada _____ 260—250

OTHER REFERENCES

H. Potts and C. Speicher: "Laser Induced Evaporation," IBM Technical Disclosure Bulletin, vol. 8, No. 2, July 1965, p. 285.

H. Potts and C. Speicher: "Control and Evaporant in Vacuum from Output of Laser," IBM Technical Disclosure Bulletin, vol. 8, No. 2, July 1965, p. 210.

ALFRED L. LEAVITT, Primary Examiner

A. GRIMALDI, Assistant Examiner

U.S. Cl. X.R.

117—93, 107; 331—94.5